(12) United States Patent
Fujimura et al.

(10) Patent No.: US 6,569,395 B1
(45) Date of Patent: May 27, 2003

(54) METHOD AND APPARATUS FOR FLUE GAS DESULFURIZATION (75) Inventors: Hiroyuki Fujimura, Tokyo (JP); Masahiro Izutsu, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/554,615

(22) PCT Filed: Dec. 1, 1998

(86) PCT No.: PCT/JP98/05386

§ 371 (c)(1),
(2), (4) Date: Jun. 30, 2000

(87) PCT Pub. No.: WO99/28017

PCT Pub. Date: Jun. 10, 1999

(30) Foreign Application Priority Data

Dec. 1, 1997 (JP) .............................................. 9-330352

(51) Int. Cl.$^7$ .............................................. B01D 53/50
(52) U.S. Cl. .................. 423/243.06; 204/157.3
(58) Field of Search ................ 204/157.3; 423/243.06; 422/168, 186

(56) References Cited

U.S. PATENT DOCUMENTS

| 4,294,674 | A |   | 10/1981 | Aoki et al. ............. 204/157.14 |
| 4,324,759 | A | * | 4/1982  | Aoki et al. .................... 422/62 |
| 4,595,569 | A | * | 6/1986  | Reuter et al. ................ 422/186 |
| 4,882,020 | A |   | 11/1989 | Maezawa et al. ......... 204/157.3 |
| 5,041,271 | A | * | 8/1991  | Aoki et al. .................. 423/235 |
| 5,834,722 | A | * | 11/1998 | Tokunaga et al. ......... 204/157.3 |
| 6,093,288 | A | * | 7/2000  | Izutsu et al. .............. 204/157.3 |
| 6,179,968 | B1 | * | 1/2001  | Izutsu et al. .............. 204/157.3 |
| 6,416,722 | B1 | * | 7/2002  | Izutsu |

FOREIGN PATENT DOCUMENTS

| EP | 0 294 658 A1 |   | 12/1988 |
| EP | 0 396 375 A2 |   | 11/1990 |
| EP | 0 716 873 A1 |   | 6/1996 |
| JP | 1-135519 A |   | 5/1989 |
| JP | 6-142446 A | * | 5/1994 |
| JP | 6-63122 U | * | 9/1994 |
| JP | 8-164324 A | * | 6/1996 |
| JP | 9-38447 A | * | 2/1997 |
| JP | 9-262431 A | * | 10/1997 |
| WO | WO 97/31702 A |   | 9/1997 |

OTHER PUBLICATIONS

"Ebara Electron Beam Flue Gas Treatment Process," vol. 1, pps. 8–26, 85–94 and 135 and 187–204, Jun., 1988.
"Ebara Electron Beam Flue Gas Treatment Process," vol. 2, Appendix, pps. 346–347, Jun., 1988.

* cited by examiner

Primary Examiner—Stanley S. Silverman
Assistant Examiner—Timothy C. Vanoy
(74) Attorney, Agent, or Firm—Oblon, Spivak, McClelland, Maier & Neustadt, P.C.

(57) ABSTRACT

A method for flue gas desulfurization in which sulfur oxides in the flue gas are converted into powdery ammonium compound, including providing an aqueous ammonia spraying device configured to atomize aqueous ammonia into droplets, cooling flue gas containing sulfur oxides down to a temperature between a saturation temperature of water and 80° C., adjusting the aqueous ammonia spraying device such that the aqueous ammonia is atomized into droplets having a Sauter mean diameter of 0.5 μm to 30 μm, and spraying the aqueous ammonia into the flue gas which has been cooled in the cooling step.

6 Claims, 7 Drawing Sheets

METHOD AND APPARATUS FOR FLUE GAS DESULFURIZATION

BACKGROUND OF THE INVENTION

1. Field of the Invention

The present invention relates to a method and an apparatus for flue gas desulfurization, and more particularly to a method and an apparatus for flue gas desulfurization by converting sulfur oxides typically comprising sulfur dioxide into powdery ammonium compound and collecting the ammonium compound.

2. Discussion of the Background

In a method for flue gas desulfurization, aqueous ammonia is sprayed and injected into flue gas containing sulfur oxides (SOx) such as combustion flue gas emitted from a boiler, and aqueous ammonia reacts with sulfur oxides to produce ammonium compound. Particularly, sulfur dioxide ($SO_2$) which is a main component of SOx reacts with aqueous ammonia ($m \cdot NH_3 + n \cdot H_2O$) and oxygen ($O_2$) to produce ammonium sulfate (($NH_4)_2SO_4$) as by-product. This chemical reaction is expressed in the following formula (1).

$$SO_2 + 2NH_3 + H_2O + 1/2 O_2 \rightarrow (NH_4)_2SO_4 + 437.7 \text{ kJ/mol} \quad (1)$$

As typically indicated in the above formula (1), the reaction in which aqueous ammonia reacts with sulfur oxides to produce ammonium compound is exothermic reaction, and water contained in aqueous ammonia sprayed and injected is consumed by reaction as shown in the left side of the formula (1) and is evaporated while removing the heat of the reaction. In general, the desulfurizing reaction as shown in the above formula (1) is liable to proceed as the temperature of flue gas is lowered, and hence removal of the heat caused by vaporization of water contained in aqueous ammonia prevents the temperature of flue gas from increasing due to the heat of the reaction and therefore prevents the desulfurizing reaction from not proceeding. Therefore, if water sprayed and injected as aqueous ammonia is controlled to a certain amount which is the sum of the amount consumed by reaction and the amount required for preventing the temperature of flue gas from increasing over a temperature suitable for desulfurizing reaction, then it is possible to evaporate water contained in aqueous ammonia completely in a process vessel.

However, if the sum of water required, the amount of ammonia required for desulfurizing reaction as shown in the above formula (1), and the concentration of aqueous ammonia are not well-balanced, then gaseous ammonia is injected or water is sprayed and injected, separately from aqueous ammonia. Besides aqueous ammonia, the sprayed and injected water and/or gaseous ammonia react with $SO_2$ according to the above formula (1).

In this manner, the reaction product such as ammonium sulfate is converted into dry powder in the process vessel, and this power is collected by a by-product collector such as a dry-type electric precipitator. The powdery by-product collected is ammonium compound such as ammonium sulfate which can be utilized as a fertilizer. Further, this desulfurizing process has such an advantage that no waste water is generated differently from a wet-type desulfurizing method in which sulfur oxides are absorbed by a slurry of lime.

However, in the method for flue gas desulfurization in which aqueous ammonia is sprayed and injected into flue gas containing sulfur oxides, and ammonium compound is collected as dry powder, the removal efficiency of SOx, particularly $SO_2$ is not generally high. Further, the remaining ammonia, in the injected aqueous ammonia, which has not reacted with SOx becomes gaseous state along with evaporation of water, and this remaining ammonia is discharged together with the remaining ammonia, in gaseous ammonia injected separately from aqueous ammonia, which has not reacted with SOx, and with the treated flue gas to the atmosphere. In order to suppress this ammonia leak, the amount of ammonia to be injected (the sum of ammonia sprayed and injected as aqueous ammonia and gaseous ammonia injected separately from the aqueous ammonia) is required to be reduced, and then the removal efficiency of SOx, particularly that of $SO_2$ is further lowered. Since unreacted ammonia corresponding to the lowered removal efficiency is discharged, the amount of ammonia which is leaked is not significantly lowered, although the amount of injected ammonia is reduced.

On the other hand, it is possible to accelerate the desulfurizing reaction by increasing the amount of water to be injected (the sum of water sprayed and injected as aqueous ammonia and water sprayed and injected separately from aqueous ammonia) and lowering the temperature of flue gas. In this case, the temperature of flue gas is equal to approximately saturation temperature of water (less than saturation temperature of water plus 5° C.) in the vicinity of the outlet of the process vessel, and therefore water in aqueous ammonia and/or water sprayed separately from aqueous ammonia are difficult to be evaporated only by the heat of reaction. Thus, a huge process vessel is required to evaporate water completely, or waste water is generated because water is not evaporated completely in the process vessel.

Therefore, normally, after aqueous ammonia is sprayed and injected into flue gas, the mixed gas is irradiated with electron beam in the range of several kGy to over a dozen kGy, and the removal efficiency of SOx, particularly that of $SO_2$ is improved even in case the temperature (not less than saturation temperature of water plus 5° C.) of flue gas at the outlet of the process vessel is higher than that of flue gas when it is not irradiated by electron beam. This is for the following purpose. The remaining $SO_2$ which has not been removed in the above formula (1) is oxidized to produce sulfur trioxide ($SO_3$) or sulfuric acid ($H_2SO_4$) by radicals such as O, OH, or $HO_2$ generated from gas molecular such as oxygen or water vapor in the flue gas by irradiation of electron beam, and the generated $SO_3$ or $H_2SO_4$ reacts with water (water contained in aqueous ammonia, water vapor evaporated from aqueous ammonia, or water vapor originally contained in flue gas) and ammonia (ammonia dissolved in aqueous ammonia, gaseous ammonia evaporated from aqueous ammonia, or gaseous ammonia injected separately from aqueous ammonia) to produce ammonium sulfate which is recovered according to the following formula (2) and (3).

$$SO_3 + 2NH_3 + H_2O \rightarrow (NH_4)_2SO_4 \quad (2)$$

$$H_2SO_4 + 2NH_3 \rightarrow (NH_4)_2SO_4 \quad (3)$$

However, in order to irradiate flue gas of weight flow Q (kg/s) with electron beam in absorbed dose of D (kGy), electric power P (kw) calculated by the following formula (4) is consumed.

$$P(kW) = Q \text{ (kg/s)} \times D(kGy)/(\eta)(\%)/100 \quad (4)$$

In the above formula (4), $\eta$ is the ratio of energy of electron beam absorbed by the flue gas to the supplied electric power, and this $\eta$ is normally in the range of 50 to 80%. Thus, a large amount of electric power is consumed for desulfurizing flue gas, and therefore it is necessary to reduce electric power consumption, increase the desulfurizing efficiency under the condition of the flue gas having a high temperature at the outlet of the process vessel (saturation temperature of water plus 5° C. or more), and reduce ammonia leak.

SUMMARY OF THE INVENTION

It is therefore an object of the present invention to provide a method and an apparatus for flue gas desulfurization which can reduce the cost of energy, and lower the amount of ammonia which is leaked while maintaining a high desulfurizing efficiency.

In order to achieve the above object, the inventors of the present application have studied intensively and found that the desulfurizing reaction as expressed by the above formula (1) is accelerated by cooling flue gas to a suitable temperature, and spraying aqueous ammonia which is atomized into fine droplets having a small Sauter mean diameter, and have accomplished the present invention.

The above object is achieved by the following means.

According to the present invention, there is provided a method for the flue gas desulfurization in which aqueous ammonia is sprayed and injected into flue gas containing sulfur oxides, and sulfur oxides are converted into powdery ammonium compound which is collected, characterized in that flue gas is cooled to a temperature range between a saturation temperature of water and 80° C., and aqueous ammonia is sprayed and injected into the cooled flue gas, wherein the aqueous ammonia is atomized into droplets having a Sauter mean diameter of 0.5 $\mu$m to 30 $\mu$m for spraying.

According to one aspect of the method of the present invention, the aqueous ammonia is atomized into droplets having a Sauter mean diameter of 0.5 $\mu$m to 10 $\mu$m.

According to one aspect of the method of the present invention, the aqueous ammonia is atomized into droplets having a Sauter mean diameter of 0.5 $\mu$m to 5 $\mu$m.

According to one aspect of the method of the present invention, the aqueous ammonia is produced by mixing ammonia gas and water, and the aqueous ammonia is mixed with air, and the mixture is sprayed.

According to one aspect of the method of the present invention, the aqueous ammonia is produced by mixing ammonia gas and air, and then mixing the mixed gas and water, and ammonia gas in the mixed gas is dissolved partly or wholly in the water to produce aqueous ammonia, and the remaining mixed gas and the aqueous ammonia are mixed and sprayed.

According to one aspect of the method of the present invention, after the aqueous ammonia is sprayed and injected into the flue gas, the flue gas is irradiated with electron beam.

According to the present invention, there is provided an apparatus for flue gas desulfurization in which flue gas containing sulfur oxides is introduced into a process vessel, aqueous ammonia is sprayed and injected into the flue gas by an aqueous ammonia spraying apparatus, and sulfur oxides are converted into powdery ammonium compound which is collected by a by-product collecting apparatus provided downstream of the process vessel, characterized in that a gas cooling apparatus is provided upstream of the process vessel to cool the flue gas to a temperature range between a saturation temperature of water and 80° C., and the aqueous ammonia spraying apparatus atomizes the aqueous ammonia into droplets having a Sauter mean of 0.5 $\mu$m to 30 $\mu$m and sprays the aqueous ammonia.

In other words, there is provided an apparatus for flue gas desulfurization comprising a process vessel into which flue gas containing sulfur oxides is introduced, an aqueous ammonia injecting apparatus provided at the inlet of the process vessel for converting sulfur oxides into powdery ammonium compound by spraying and injecting aqueous ammonia, and a by-product collecting apparatus provided downstream of the process vessel for collecting powdery ammonium compound, characterized in that a gas cooling apparatus is provided upstream of the process vessel for cooling flue gas to a temperature range between a saturation temperature of water and 80° C., and the aqueous ammonia injecting apparatus atomizes aqueous ammonia into droplets having a Sauter mean diameter of 0.5 $\mu$m to 30 $\mu$m and sprays the aqueous ammonia.

According to one aspect of the apparatus of the present invention, the aqueous ammonia is atomized into droplets having a Sauter means diameter of 0.5 $\mu$m to 10 $\mu$m and sprayed.

According to one aspect of the apparatus of the present invention, the aqueous ammonia is atomized into droplets having a Sauter mean diameter of 0.5 $\mu$m to 5 $\mu$m and sprayed.

According to one aspect of the apparatus of the present invention, the aqueous ammonia spraying apparatus comprises an aqueous ammonia generating apparatus for mixing ammonia gas and water, and a two-fluid nozzle for mixing the aqueous ammonia and air and spraying the mixture.

According to one aspect of the apparatus of the present invention, the aqueous ammonia spraying apparatus comprises a gas mixer for mixing ammonia gas and air, and a two-fluid nozzle for mixing the mixed gas and water in a gas-liquid mixing compartment and dissolving ammonia gas in the mixed gas partly or wholly in the water to produce aqueous ammonia, and mixing the remaining mixed gas and the aqueous ammonia and spraying the mixture.

According to one aspect of the apparatus of the present invention, the aqueous ammonia spraying apparatus comprises an impact atomizing apparatus for causing the droplets sprayed from the two-fluid nozzle to collide with an obstacle and further atomizing the droplets.

According to one aspect of the apparatus of the present invention, the aqueous ammonia spraying apparatus comprises an atomizing and classifying apparatus for selecting droplets having a small diameter from the atomized droplets by collision with an obstacle by gravitation and/or the force of the wind and injecting the selected droplets into the flue gas.

According to one aspect of the apparatus of the present invention, in the process vessel, after aqueous ammonia is sprayed and injected into the flue gas, the flue gas is irradiated with electron beam.

The inventors of the present application have found that the desulfurizing reaction as expressed in the above formula (1) is remarkably accelerated in a gas-liquid interface between aqueous ammonia and gas, and therefore the removal efficiency of SOx is increased by enlarging the total surface area of Ae (m$^2$/m$^3$) (specific surface area) of droplets of aqueous ammonia per unit volume of gas. Further, in the case where aqueous ammonia of L (m$^2$) is sprayed and injected into flue gas of G (m$^3$), and the droplets of aqueous ammonia are distributed in d-n particle size distribution in which the number of particles having particle diameter of d (m) is n, then Ae is calculated by the following formula (5).

$$Ae = \{\Sigma n 4\pi (d/2)^2\}/G \qquad (5)$$
$$= \{\pi \Sigma nd^2 \times (\Sigma nd^3/\Sigma nd^2)\}/\{G(\Sigma nd^3/\Sigma nd^2)\}$$
$$= \pi \Sigma nd^3/(Gd_{32}) = [6(\Sigma n 4\pi/3(d/2)^3]/(Gd_{32}) = 6L/(Gd_{32})$$
$$= 6(L/G)/d_{32}$$

Here, $d_{32} = \Sigma nd^3/\Sigma nd^2$ is called Sauter mean diameter. Therefore, by the above formula (5), specific surface area of droplets of aqueous ammonia is larger as the Sauter mean diameter is smaller. In this manner, the inventors of the present application have accomplished the present invention in which a high desulfurizing efficiency can be achieved by atomizing aqueous ammonia into droplets having a Sauter mean diameter of 30 μm or smaller, preferably 10 μm or smaller, and more preferably 5 μm or smaller, and spraying the aqueous ammonia. Gravitation and/or the force of the wind and injecting the selected droplets into the flue gas.

However, the inventors of the present application have studied further and found that if the diameter of droplet of aqueous ammonia is excessively small when the droplet is sprayed, the desulfurizing efficiency can not be improved. The reason for this is considered as follows. That is, if the diameter of droplet of aqueous ammonia is small, evaporation is accelerated due to not only the heat of reaction caused by the desulfurizing reaction in droplets of aqueous ammonia but also molecular movement caused by the difference between water vapor pressure in flue gas and water vapor pressure on the surface of droplet. Therefore, if the diameter of droplet is extremely small, water content is completely evaporated before the desulfurizing reaction as expressed in the above formula (1) proceeds sufficiently on the surface of droplet, and hence ammonia in aqueous ammonia is evaporated and the droplets of aqueous ammonia disappear. Thereafter, SOx, water vapor, gaseous ammonia, and oxygen, if necessary, react only in gaseous phase in which the reaction rate is much slower than that on the surface of droplet of aqueous ammonia, with the result that the desulfurizing efficiency is lowered.

In order to solve this problem, the inventors of the present application have made the present invention in which before aqueous ammonia is sprayed and injected into flue gas, the flue gas is cooled to a temperature range between a saturation temperature of water and 80° C., preferably a temperature range between a saturation temperature of water and 70° C. In this manner, when aqueous ammonia is sprayed and injected, water vapor pressure in flue gas is high, and hence the droplets of aqueous ammonia are prevented from being evaporated by molecular movement caused by the difference between water vapor pressure in flue gas and water vapor pressure on the surface of droplet. Thus, aqueous ammonia is evaporated mainly due to the heat of reaction caused by the desulfurizing reaction in droplets of aqueous ammonia, and it is possible for the droplets to continue to exist until the desulfurizing reaction proceeds sufficiently on the surfaces of droplets. Before aqueous ammonia is sprayed and injected into flue gas, even if the flue gas is cooled to approximately a saturation temperature of water, heat other than that used for evaporation of water contained in aqueous ammonia in the heat of reaction caused by the desulfurizing reaction is absorbed in the flue gas, and hence the temperature of flue gas at the outlet of the process vessel increases to a saturation temperature of water plus 5° C. or higher, and it is possible to prevent generation of waste water.

Before aqueous ammonia is sprayed and injected into flue gas, even if the temperature of flue gas is controlled at a temperature range between a saturation temperature of water and 80° C., preferably a temperature range between a saturation temperature of water and 70° C., when aqueous ammonia is atomized into droplets having a Sauter mean diameter of less than 0.5 μm, it is very difficult to suppress evaporation of water caused by molecular movement due to the difference between water vapor pressure in the flue gas and water vapor pressure on the surface of droplet. Therefore, it is necessary that the Sauter mean diameter of droplets of aqueous ammonia is in the range of 0.5 μm to 30 μm, preferably in the range of 0.5 to 10 μm, and more preferably in the range of 0.5 to 5 μm.

In this manner, the inventors of the present application have found that after flue gas is cooled to a temperature range between a saturation temperature of water and 80° C., preferably a temperature range between a saturation temperature of water and 70° C., aqueous ammonia is sprayed and injected, and specifically aqueous ammonia is atomized into droplets having a Sauter mean diameter of 0.5 μm to 30 μm, preferably 0.5 μm to 10 μm, and more preferably 0.5 μm to 5 μm an sprayed, whereby a high desulfurizing efficiency can be achieved on the condition that the temperature of flue gas is high at the outlet of the process vessel (a saturation temperature of water plus 5° C. or higher). As described above, by enlarging specific surface area of aqueous ammonia contained in gas, the desulfurizing reaction as expressed in the above formula (1) is accelerated, and ammonia is consumed with the removal of $SO_2$, and hence the amount of remaining ammonia which is leaked can be lowered.

Further, after aqueous ammonia is sprayed and injected, by irradiation of electron beam, the temperature of the flue gas at the outlet of the process vessel is further raised, and/or a higher desulfurizing efficiency can be achieved. In this case, flue gas is cooled to a temperature range between a saturation temperature of water and 80° C., preferably a temperature range between a saturation temperature of water and 70° C., and then aqueous ammonia is sprayed and injected into the cooled gas. Specifically, aqueous ammonia is atomized into droplets having a Sauter mean diameter of 0.5 μm to 30 μm, preferably 0.5 μm to 10 μm, and more preferably 0.5 μm to 5μm and sprayed. In this manner, the dose of electron beam becomes smaller than that in the conventional method, and thus electron power consumption can be reduced.

As a method for spraying and injecting aqueous ammonia, there is a method in which ammonia and water are mixed to produce aqueous ammonia, and the produced aqueous ammonia is mixed with compressed air, and then sprayed. Further, there is a method in which ammonia gas and compressed air are mixed with each other, the mixed gas and water are mixed with each other, and ammonia gas in the mixed gas is dissolved partly or wholly in water to produce aqueous ammonia, and then the remaining mixed gas and the produced aqueous ammonia are mixed with each other and sprayed. If the amount of aqueous ammonia and water in the sprayed mixture is constant, the concentration of ammonia in aqueous ammonia in the former method is higher than that in the latter method, and thus the desulfurizing efficiency becomes high. However, in the former method, a large-scale apparatus for producing aqueous ammonia by mixing ammonia gas and water is necessary, and it is difficult to change the amount of ammonia and the amount of water to be injected independently according to flue gas flow rate and the concentration of sulfur oxides in flue gas. On the other hand, in the latter method, since all amount of ammonia in the mixed gas produced by mixing ammonia gas and compressed air is not necessarily dissolved, the concentration of ammonia in aqueous ammonia tends to be lowered. However, mixing of ammonia gas and compressed air can be easily conducted, and mixing of the mixed gas and water and spraying the mixture can be performed by a small-scale two-fluid nozzle. Further, the amount of ammonia and the amount of water to be injected can be independently and easily changed.

Mixing of compressed air and aqueous ammonia, or mixing of the mixed gas of ammonia gas and compressed air, and water, and spraying of them can be performed by the two-fluid nozzle. Further, the two-fluid nozzle may incorporate an impact atomizing apparatus for atomizing droplets sprayed by the two-fluid nozzle by impact generated when the droplets collide with an obstacle, or a particle classifying apparatus for selecting droplets having a small diameter using gravitation or the force of the wind and injecting the selected droplets into flue gas to make the diameters of the droplets of aqueous ammonia smaller.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
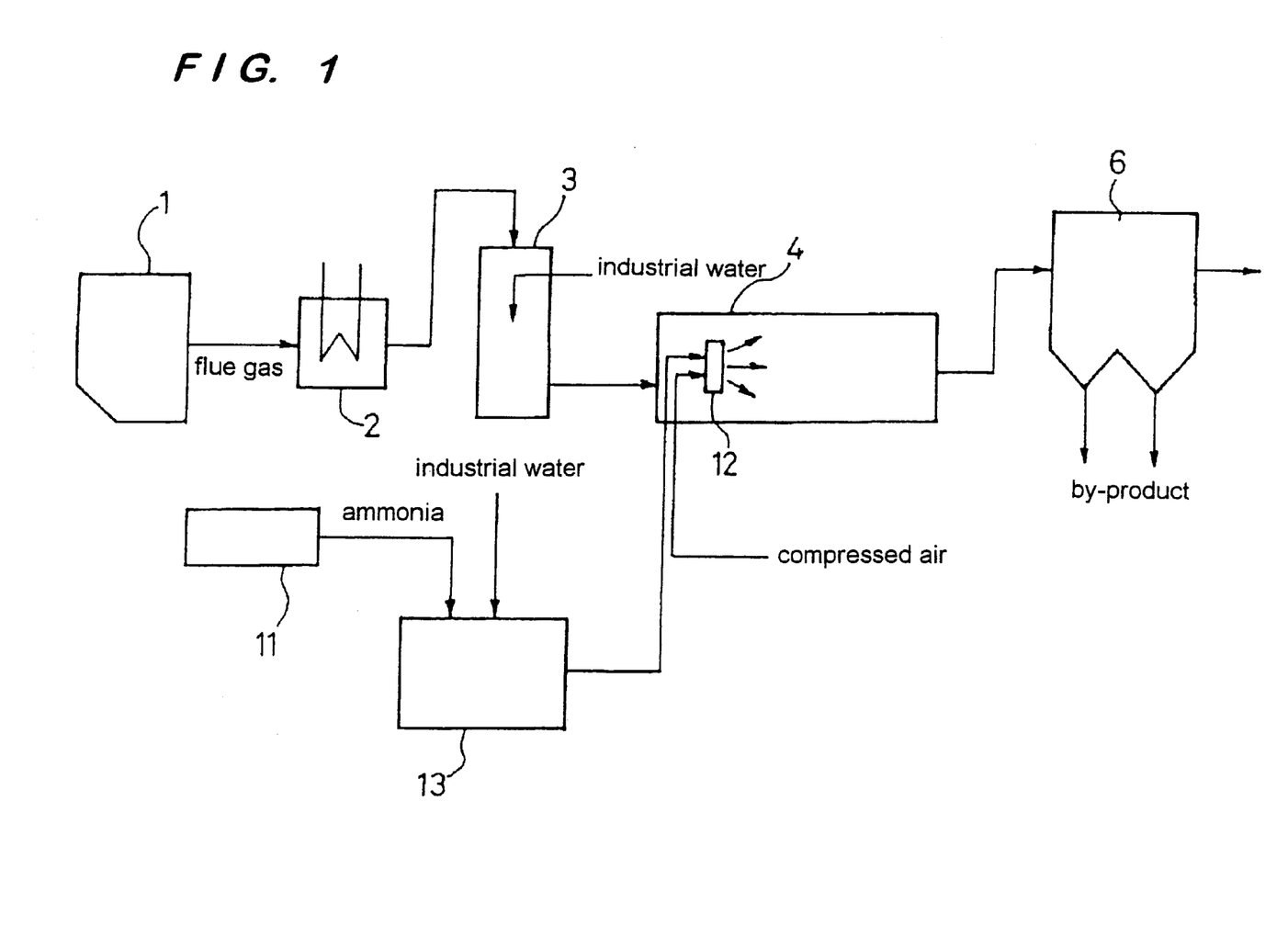
FIG. 1 is a schematic view showing a method and an apparatus for flue gas desulfurization according to an embodiment of the present invention.

FIG. 1 is a schematic view showing a method and an apparatus for flue gas desulfurization according to an embodiment of the present invention.

Flue gas containing sulfur oxides generated from a boiler 1 is cooled in a heat exchanger 2, the cooled by a gas cooling apparatus 3 in which the flue gas contacts industrial water, and then introduced into a process vessel 4. On the other hand, ammonia supplied from an ammonia supply facility 11 is mixed with industrial water in an aqueous ammonia generating apparatus 13 to produce aqueous ammonia, aqueous ammonia is mixed with compressed air in a two-fluid nozzle 12 provided at the inlet of the process vessel, and a gas-liquid mixture is sprayed by the two-fluid nozzle 12 to inject the atomized droplets of aqueous ammonia into the flue gas. Thereafter, the produced powdery by-product composed mainly of ammonium sulfate is collected by a dry-tape electric precipitator 6.

Figure 2:
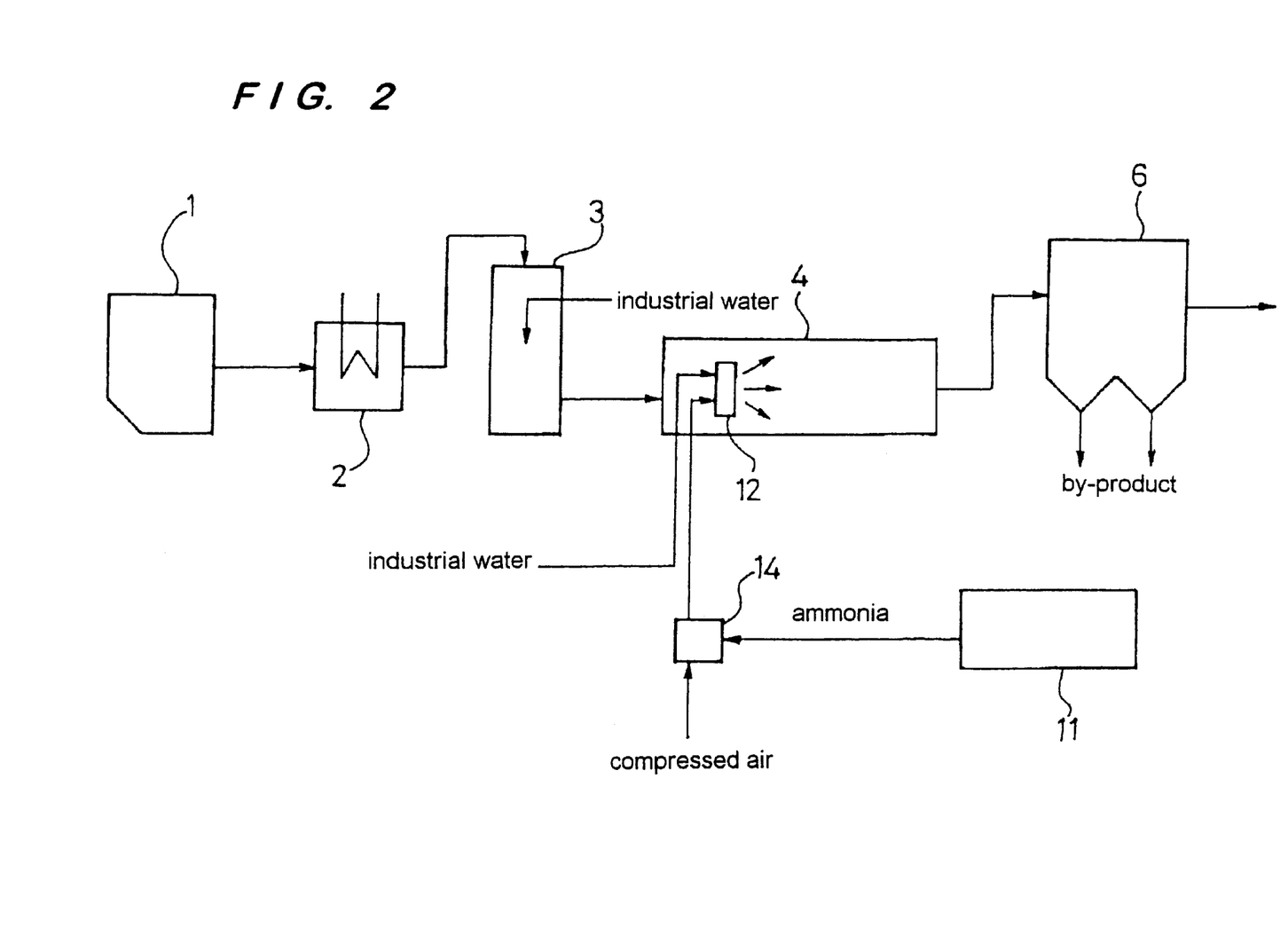
FIG. 2 is a schematic view showing a method and an apparatus for flue gas desulfurization according to another embodiment of the present invention.

FIG. 2 is a schematic view showing a method and an apparatus for flue gas desulfurization according to another embodiment of the present invention.

Flue gas containing sulfur oxides generated from a boiler 1 is cooled in a heat exchanger 2, then cooled by a gas cooling apparatus 3 in which the flue gas contacts industrial water, and then introduced into a process vessel 4. On the other hand, ammonia supplied from an ammonia supply facility 11 is mixed with compressed air in a line mixer 14 to produce a mixed gas, and the mixed gas and industrial water are mixed with each other in a gas-liquid mixing compartment of a two-fluid nozzle 12 provided at the inlet of the process vessel. Thus, ammonia gas in the mixed gas is dissolved partly or wholly in water to produce aqueous ammonia, and the remaining mixed gas and the produced aqueous ammonia are mixed in the two-fluid nozzle 12 and sprayed, whereby atomized droplets of aqueous ammonia and the remaining gaseous ammonia are injected into the flue gas. Thereafter, the produced powdery by-product composed mainly of ammonium sulfate is collected by a dry-type electric precipitator 6. The line mixer 14 constitutes a gas mixer.

Figure 3:
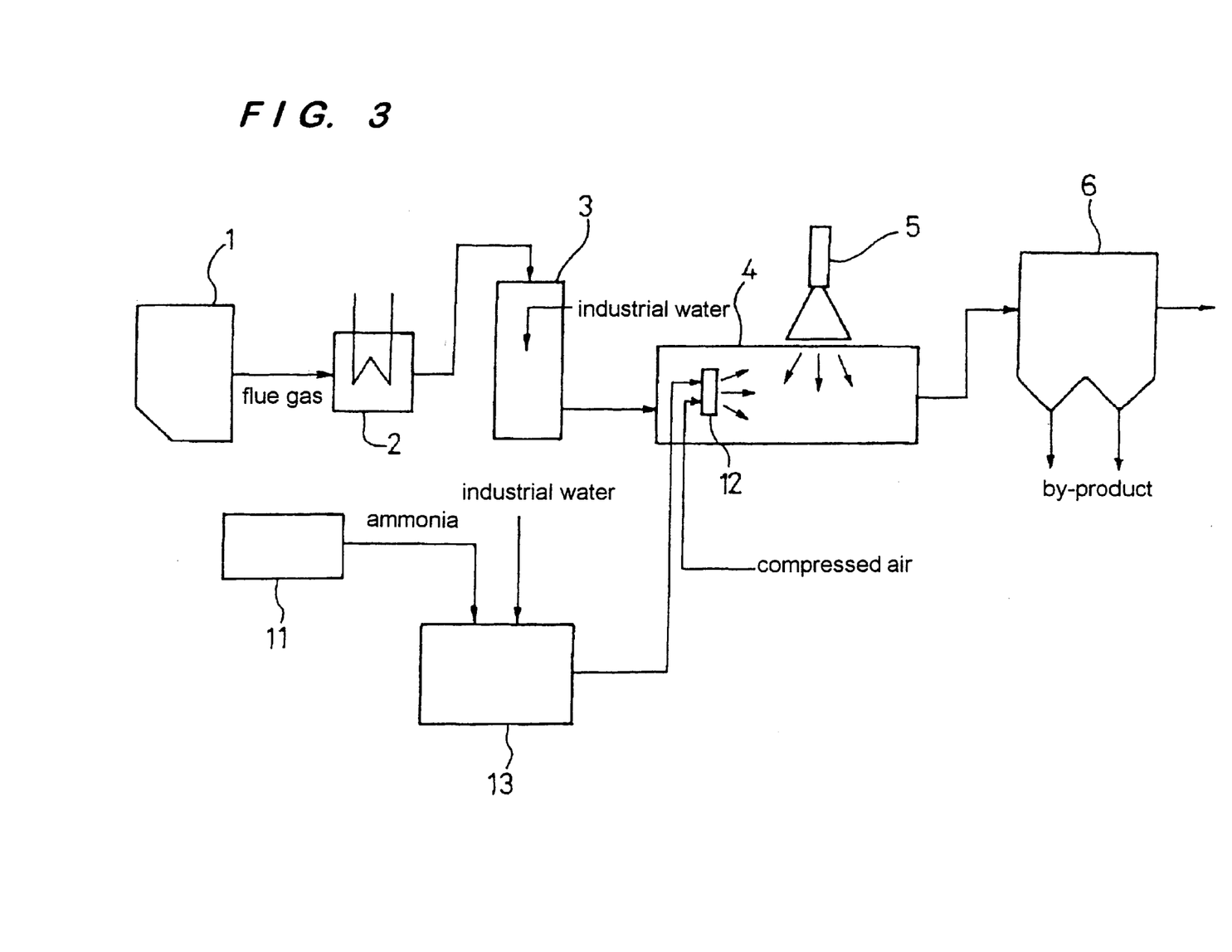
FIG. 3 is a schematic view showing a method and an apparatus for flue gas desulfurization according to still another embodiment of the present invention.

FIG. 3 is a schematic view showing a method and an apparatus for flue gas desulfurization according to still another embodiment of the present invention.

Flue gas containing sulfur oxides generated from a boiler 1 is cooled in a heat exchanger 2, then cooled by a gas cooling apparatus 3 in which the flue gas contacts industrial water, and then introduced into a process vessel 4. On the other hand, ammonia supplied from an ammonia supply facility 11 is mixed with industrial water in an aqueous ammonia generating apparatus 13 to produce aqueous ammonia, and aqueous ammonia is mixed with compressed air in a two-fluid nozzle 12 provided at the inlet of the process vessel, and a gas-liquid mixture is sprayed by the two-fluid nozzle 12 to inject atomized droplets of aqueous ammonia into the flue gas. The flue gas into which aqueous ammonia has been sprayed and injected is irradiated with electron beam by an electron accelerator 5 in the process vessel 4. Thereafter, the produced powdery by-product composed mainly of ammonium sulfate is collected by a dry-type electric precipitator 6.

Figure 4:
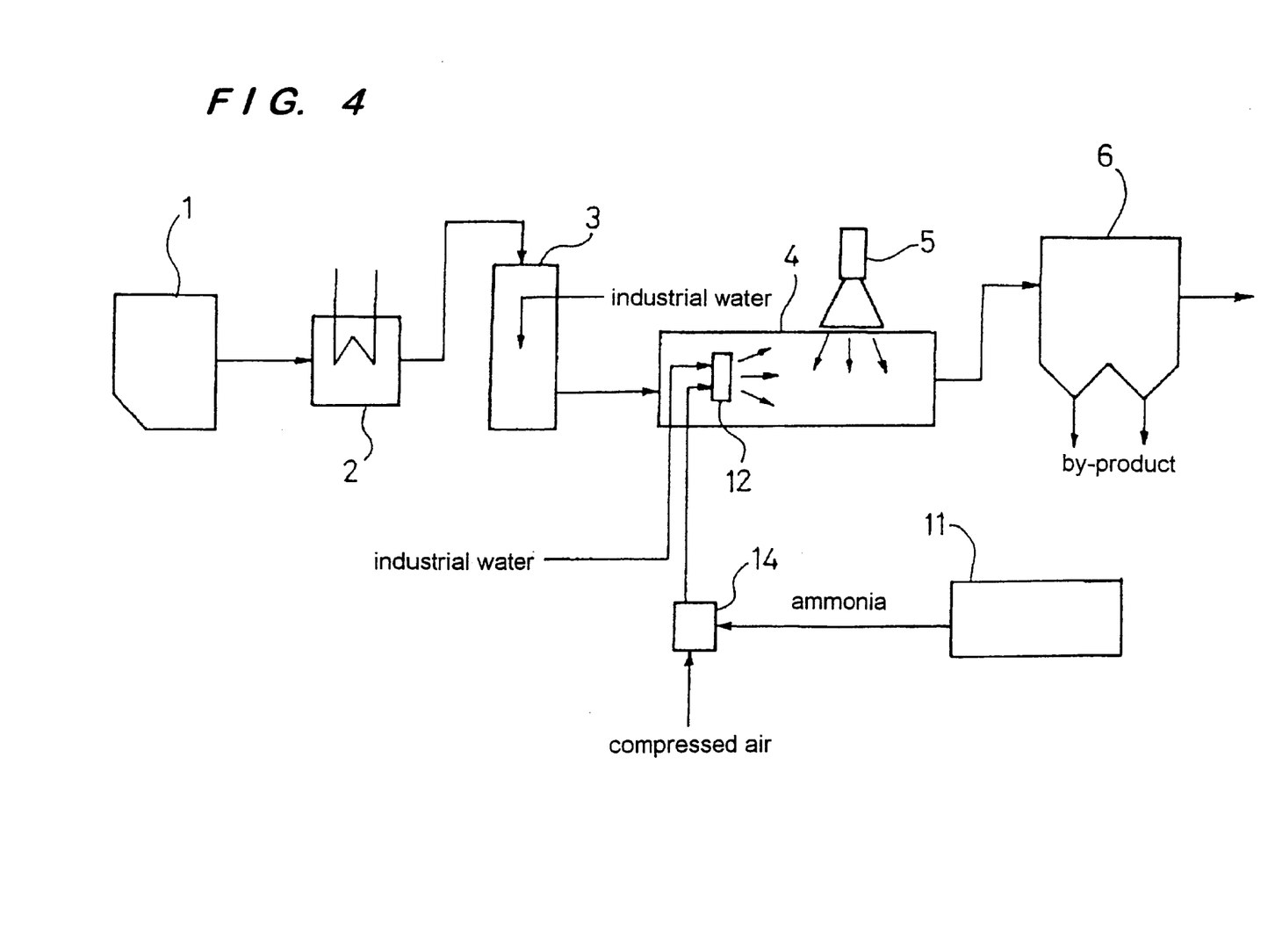
FIG. 4 is a schematic view showing a method and an apparatus for flue gas desulfurization according to still another embodiment of the present invention.

FIG. 4 is a schematic view showing a method and an apparatus for flue gas desulfurization according to still another embodiment of the present invention.

Flue gas containing sulfur oxides generated from a boiler 1 is cooled in a heat exchanger 2, then cooled by a gas cooling apparatus 3 in which the flue gas contacts industrial water, and then introduced into a process vessel 4. On the other hand, ammonia supplied from an ammonia supply facility 11 is mixed with compressed air in a line mixer 14 to produce a mixed gas, and the mixed gas and industrial water are mixed with each other in a gas-liquid mixing compartment of a two-fluid nozzle 12 provided at the inlet of the process vessel. Thus, ammonia gas in the mixed gas is dissolved partly or wholly in water to produce aqueous ammonia, and the remaining mixed gas and the produced aqueous ammonia are mixed in the two-fluid nozzle 12 and sprayed, whereby atomized droplets of aqueous ammonia and the remaining gaseous ammonia are injected into the flue gas. The flue gas into which aqueous ammonia and gaseous ammonia have been sprayed and injected is irradiated with electron beam by an electron accelerator 5 in the process vessel 4. Thereafter, the produced powdery by-product composed mainly of ammonium sulfate is collected by a dry-type electric precipitator 6. The line mixer 14 constitutes a gas mixer 4.

Figure 5:
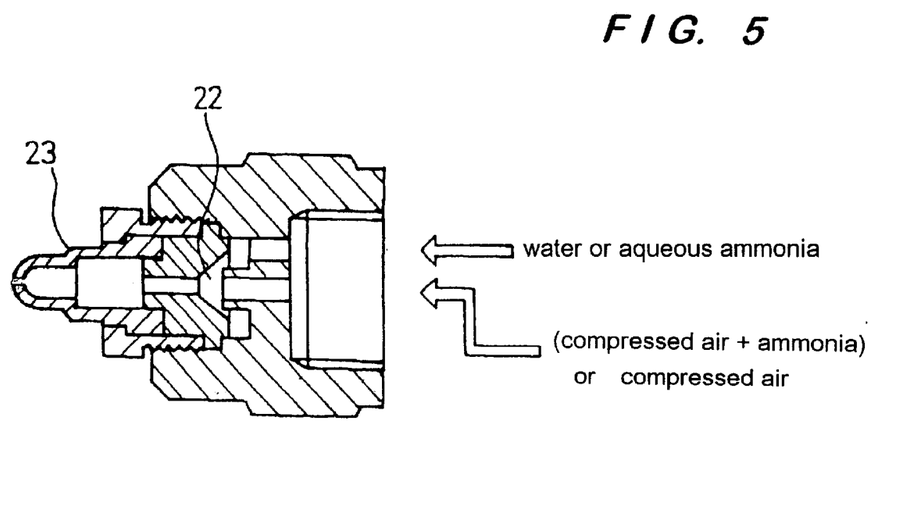
FIG. 5 is a cross-sectional view of a two-fluid nozzle used in the process according to an embodiment.
Figure 6:
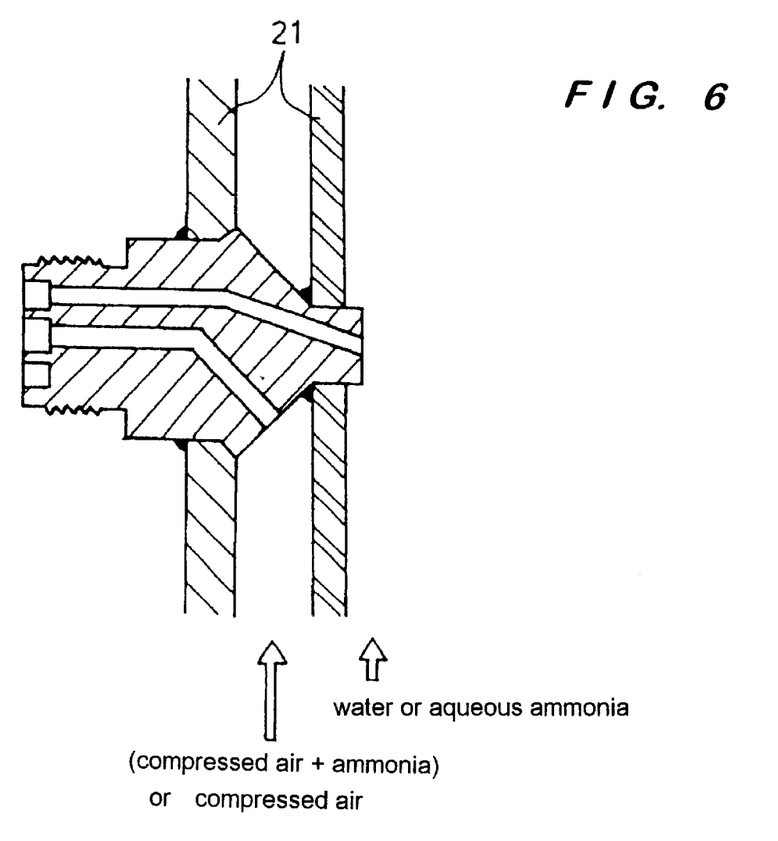
FIG. 6 is a cross-sectional view of the an adapter of the two-fluid nozzle according to an embodiment.

FIG. 5 shows the two-fluid nozzle used in the process shown in FIGS. 1 through 4 according to an embodiment. Further, FIG. 6 shows an adapter of the two-fluid nozzle according to an embodiment. A mixed gas of ammonia and compressed air, and water, or compressed air and aqueous ammonia supplied from a gas-liquid double tube 21 are mixed in a gas-liquid mixing compartment 22 of the two-fluid nozzle, and sprayed from a forward end of a nozzle chip 23.

The experiments using the apparatuses shown in FIGS. 2 and 4 will described below. However, the present invention is not limited to these experiments.

Flue gas of 1,500 m³N/h containing 850 ppm of sulfur oxides and generated by the boiler 1 was cooled to 150° C. by the heat exchanger 2, and then cooled to a saturation temperature of water plus 10° C., i.e. 50° C. in the gas cooling apparatus 3 in which the flue gas contacts industrial water. Thereafter, the flue gas was introduced into the process vessel 4. On the other hand, ammonia of 2.3 m³N/h supplied from the ammonia supply facility 11 was mixed with compressed air in the line mixer 14 to produce a mixed gas. The mixed gas and industrial water of 18 kg/h were mixed with each other in the gas-liquid mixing compartment in the two-fluid nozzle 12 provided at the inlet of the process vessel, and ammonia gas in the mixed gas was dissolved partly or wholly in water to produce aqueous ammonia. Thereafter, the remaining mixed gas and the produced aqueous ammonia were mixed with each other in the two-fluid nozzle and sprayed, and hence the atomized droplets of aqueous ammonia and the remaining gaseous ammonia were injected into the flue gas. Further, in the experiments using the apparatus shown in FIG. 4, the flue gas into which aqueous ammonia and gaseous ammonia were sprayed and injected was irradiated with electron beam by an electron accelerator 5 in the process vessel 4. In either case, the produced powdery by-product composed mainly of ammonium sulfate was collected by the dry-type electric precipitator 6.

In the experiments, the type of the two-fluid nozzle, the pressure of compressed air, and the flow rate of compressed air were changed, and hence the Sauter mean diameter ($d_{32}=\Sigma nd^3/\Sigma nd^2$) of droplets of aqueous ammonia sprayed and injected was changed. Further, in the experiments using the apparatus shown in FIG. 4, beam current in electron beam was changed and absorbed dose was changed to examine the change of the desulfurizing efficiency.

Figure 7:
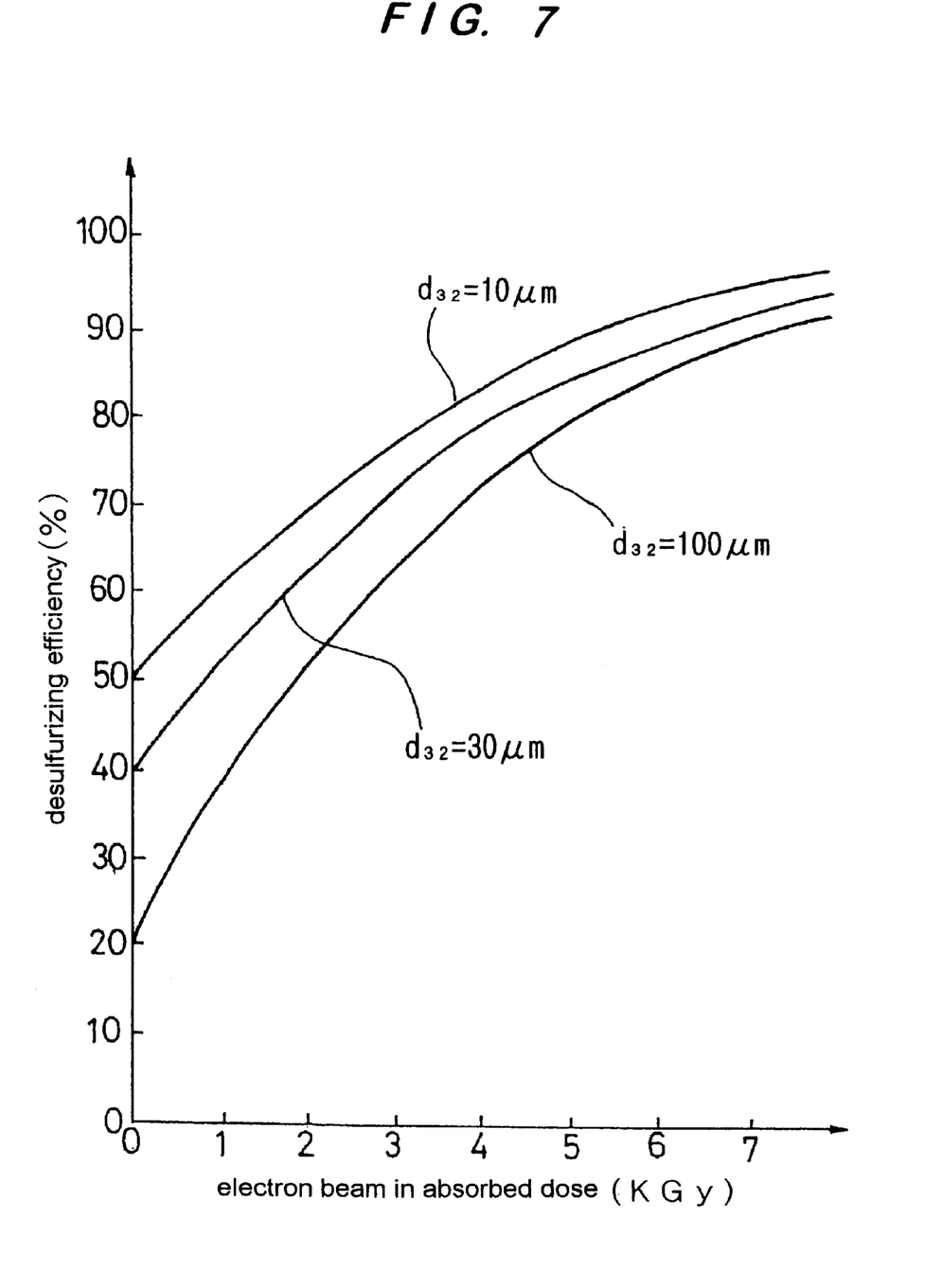
FIG. 7 is a graph showing the relationship among Sauter mean diameter, the desulfurizing efficiency, and absorbed dose of electron beam.

FIG. 7 shows the results of the experiments. As shown in FIG. 7, the smaller the Sauter mean diameter of droplets of aqueous ammonia is, the higher the desulfurizing efficiency is. Particularly, even if absorbed dose is zero in the experiments using the apparatus shown in FIG. 2, when the Sauter mean diameter is about 10 µm, a high desulfurizing efficiency of approximately 50% can be achieved. As a method for removing sulfur oxides, this is practically desirable value. Further, FIG. 7 shows that even if absorbed dose is zero, when the Sauter mean diameter is about 30 µm, a relatively high desulfurizing efficiency of about 40% can be achieved. As a method for removing sulfur oxides, this is practically usable value. Further, in the case where the Sauter mean diameter is more than 30 µm, when it is 100 µm or lower, even if the absorbed dose is zero, a desulfurizing efficiency of 20% or higher can be achieved. However, in the case where the Sauter mean diameter is more than 30 µm, water content in sprayed aqueous ammonia is not evaporated completely, and waste water is generated in the process vessel 4 and the duct connecting the process vessel 4 and the dry-type electric precipitator 6. Therefore, it is desirable that the Sauter mean diameter is equal to or smaller than 30 µm.

Figure 8:
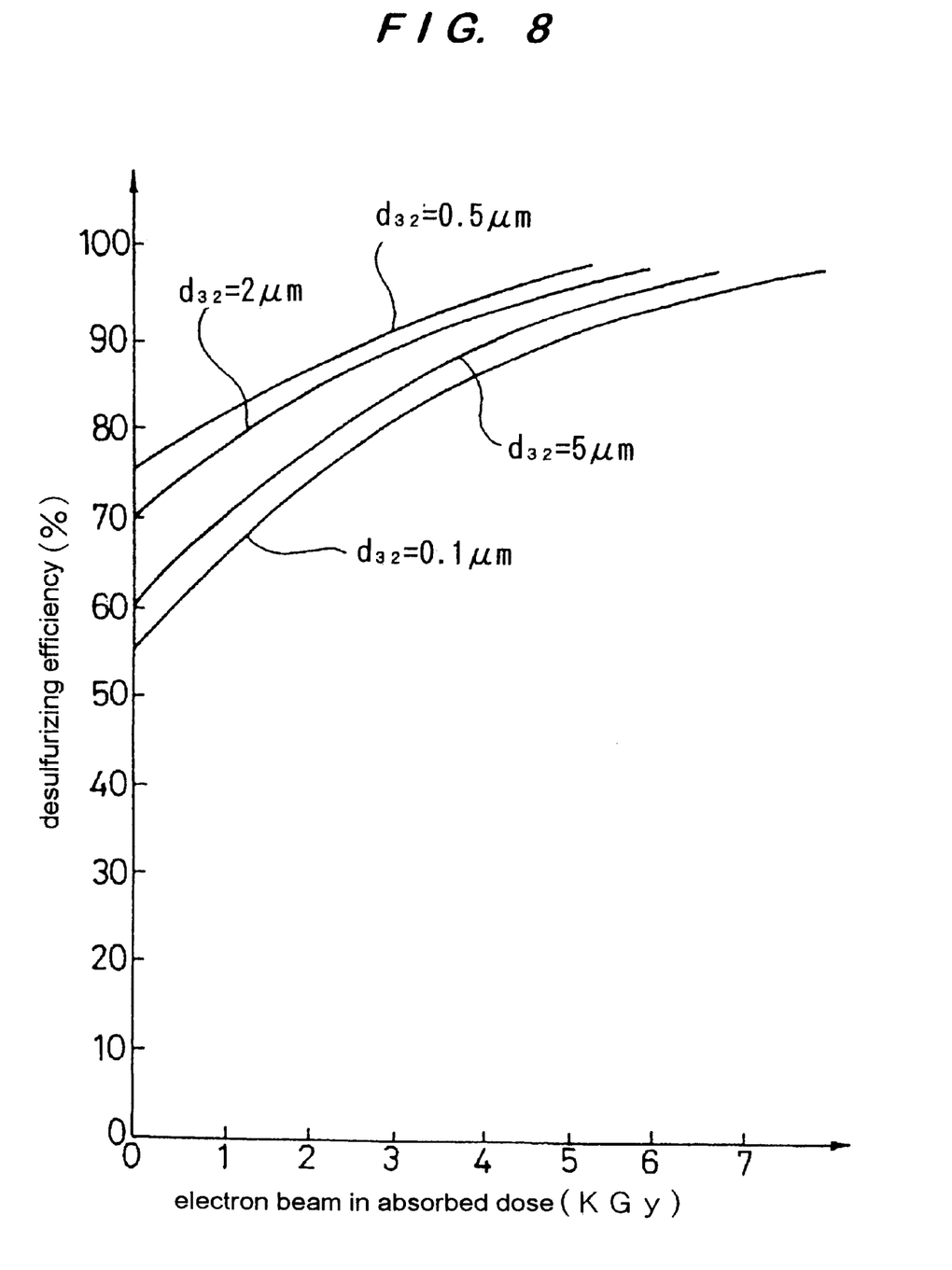
FIG. 8 is a graph showing the relationship among Sauter mean diameter, the desulfurizing efficiency, and absorbed dose of electron beam.

Instead of the two-fluid nozzle 12 shown in FIGS. 2 and 4, there was provided an aqueous ammonia spraying apparatus which incorporated an impact atomizing apparatus with an obstacle and a atomizing and classifying apparatus which were added to the two-fluid nozzle, whereby droplets sprayed by the two-fluid nozzle collided with the obstacle to be further atomized, the droplets having a small diameter were selected from the atomized droplets by using gravitation and the force of the wind, and the selected droplets were sprayed. Thus, the following experiments were conducted in the same manner as FIG. 7. FIG. 8 shows the results of the experiments. As shown in FIG. 8, when the Sauter mean diameter of droplets of aqueous ammonia is about 5 µm, a high desulfurizing efficiency of about 60% can be achieved. As a method for removing sulfur oxides, this is practically desirable value. Further, as shown in FIG. 8, up to the Sauter mean diameter of 0.5 µm, the smaller the diameter of droplet is, the higher the desulfurizing efficiency is. However, in the case where the Sauter mean diameter is smaller than 0.5 µm, conversely the desulfurizing efficiency is lowered. Therefore, it is desirable that the Sauter mean diameter is equal to or larger than 0.5 µm.

According to a method and an apparatus for flue gas desulfurization in the present invention, flue gas is cooled to a saturation temperature of water or higher and 80% or lower, and aqueous ammonia is sprayed and injected into the flue gas. Specifically, aqueous ammonia is atomized into droplets having a Sauter mean diameter of 0.5 µm, to 30 µm, preferably 0.5 µm to 10 µm, and more preferably 0.5 µm to 5 µm. Thus, energy cost is reduced, and the amount of ammonia which is leaked is lowered while maintaining a high desulfurizing efficiency.

Further, after aqueous ammonia is sprayed and injected into flue gas, by irradiation of electron beam, the temperature of flue gas at the outlet of the process vessel is further raised and/or a higher desulfurizing efficiency can be achieved.

The present invention is applicable to a flue gas treatment system for removing sulfur oxides contained in combustion flue gas generated when various fuel such as coal or oil is combusted.

What is claimed is:

1. A method for flue gas desulfurization in which sulfur oxides in flue gas are converted into powdery ammonium compound, comprising the steps of:

providing an aqueous ammonia spraying device configured to atomize aqueous ammonia into droplets;

cooling flue gas containing sulfur oxides down to a temperature between a saturation temperature of water and 80° C.;

adjusting the aqueous ammonia spraying device such that the aqueous ammonia is atomized into droplets having a Sauter mean diameter of 0.5 µm to 30 µm; and spraying said aqueous ammonia into the flue gas which has been cooled in the cooling step.

2. A method according to claim 1, wherein said adjusting step comprises adjusting the aqueous ammonia spraying device such that said aqueous ammonia is atomized into droplets having a Sauter mean diameter of 0.5 µm to 10 µm.

3. A method according to claim 1, wherein said adjusting step comprises adjusting the aqueous ammonia spraying device such that said aqueous ammonia is atomized into droplets having a Sauter mean diameter of 0.5 µm to 5 µm.

4. A method according to claim 1, wherein said adjusting step comprises mixing ammonia gas and water to produce the aqueous ammonia, adjusting pressure and flow rate of air and mixing said aqueous ammonia with the air.

5. A method according to claim 1, wherein;
    said aqueous ammonia is produced by mixing ammonia gas and air, and then mixing with water to dissolve said ammonia gas at least partly in said water; and
    said atomizing step comprises mixing an undissolved portion of said ammonia gas and air with said aqueous ammonia.

6. A method according to claim 1, further comprising irradiating said flue gas sprayed with said aqueous ammonia with electron beam.

* * * * *